(12) United States Patent  
Amirehteshami et al.

(10) Patent No.: US 7,703,669 B2  
(45) Date of Patent: Apr. 27, 2010

(54) INTELLIGENT FASTENER INSTALLATION SYSTEM

(75) Inventors: David H. Amirehteshami, Los Alamitos, CA (US); Branko Sarh, Huntington Beach, CA (US); William P. Zanteson, Monrovia, CA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 11/931,628

(22) Filed: Oct. 31, 2007

(65) Prior Publication Data

US 2009/0112925 A1 Apr. 30, 2009

(51) Int. Cl.
  *G06F 17/00* (2006.01)
  *F16B 31/00* (2006.01)
  *G08B 13/14* (2006.01)
(52) U.S. Cl. .................... 235/375; 340/572.8
(58) Field of Classification Search ........... 235/375; 340/572.8
  See application file for complete search history.

(56) References Cited

U.S. PATENT DOCUMENTS

| 5,448,846 | A | 9/1995 | Peterson et al. |
| 5,615,504 | A | 4/1997 | Peterson et al. |
| 6,073,552 | A | 6/2000 | Cruse et al. |
| 6,095,739 | A | 8/2000 | Albertson et al. |
| 6,843,628 | B1* | 1/2005 | Hoffmeister et al. ......... 411/14 |
| 7,412,898 | B1* | 8/2008 | Smith et al. ................... 73/761 |
| 2004/0067120 | A1* | 4/2004 | Speer .......................... 411/14 |

FOREIGN PATENT DOCUMENTS

| DE | 199 17 222 A1 | 11/2000 |
| EP | 1 188 521 A2 | 3/2002 |

\* cited by examiner

*Primary Examiner*—Michael G Lee
*Assistant Examiner*—Laura Gudorf
(74) *Attorney, Agent, or Firm*—Klintworth & Rozenblat IP LLC

(57) ABSTRACT

One embodiment of a fastening apparatus may include at least one of a fastener and a collar having a code with information regarding the fastener and/or collar. The code may be communicated to one or more databases of a computer. The fastener and/or collar may be tightened, located, maintained, and/or inspected according to the code and/or database information.

31 Claims, 10 Drawing Sheets

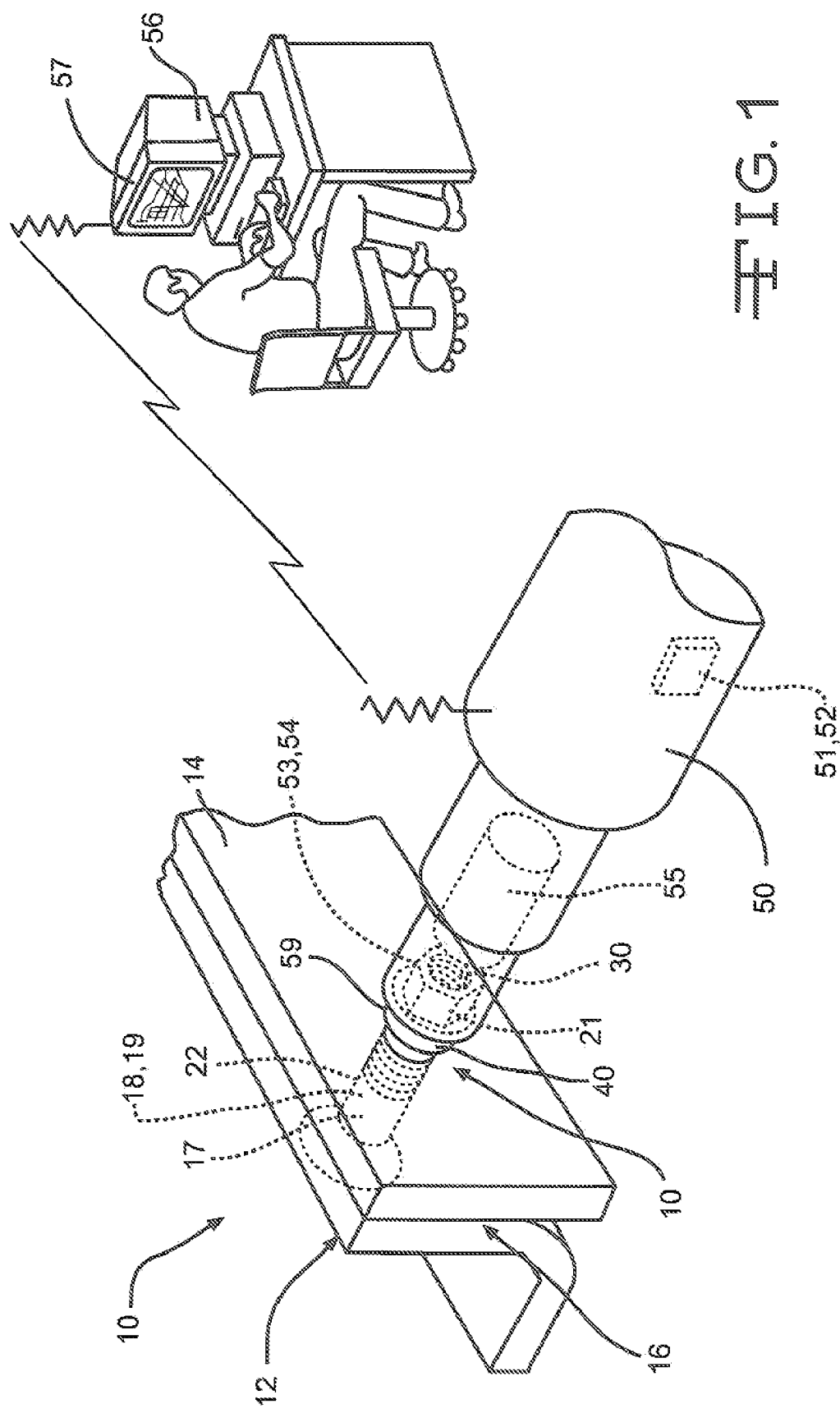

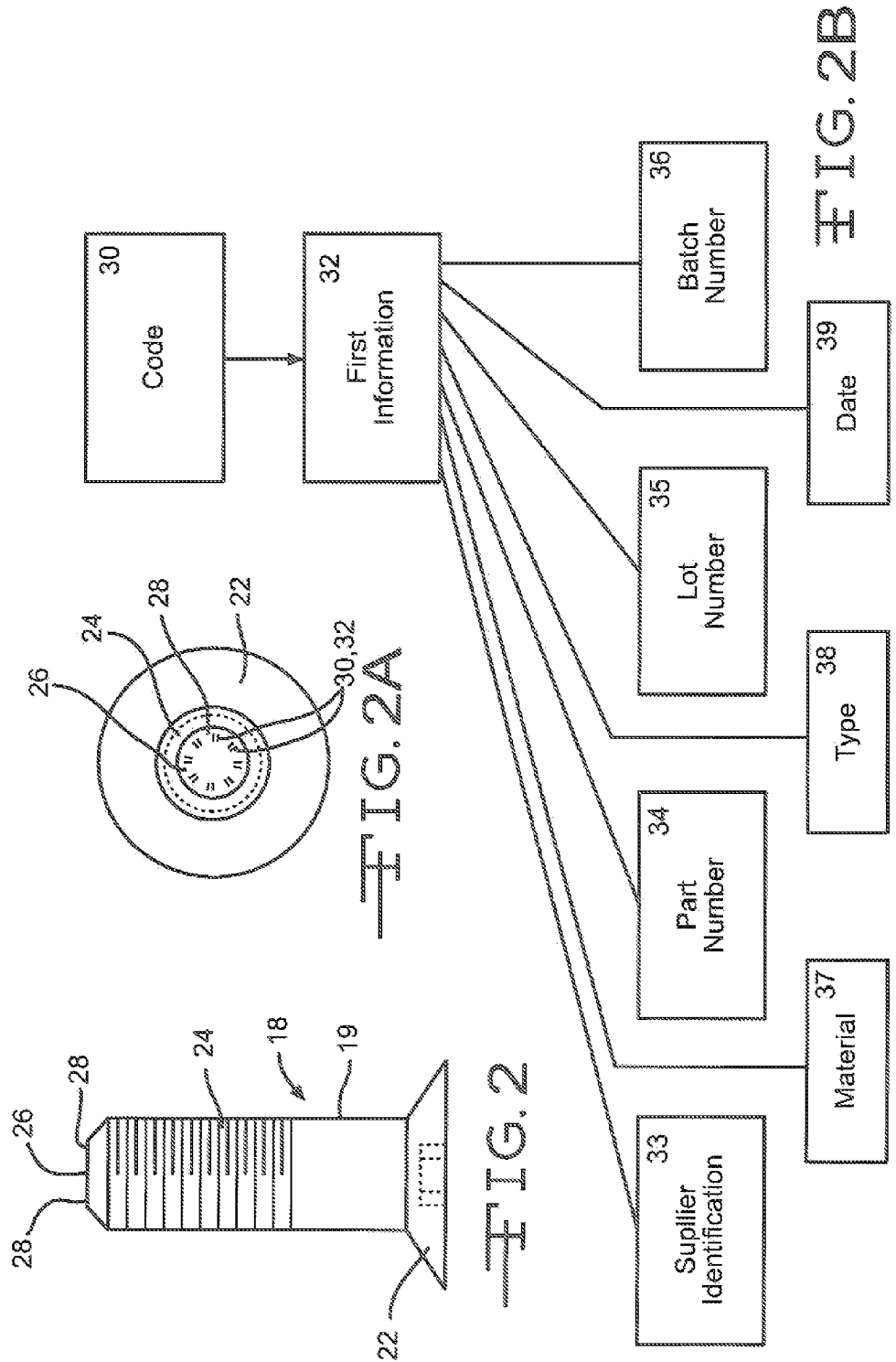

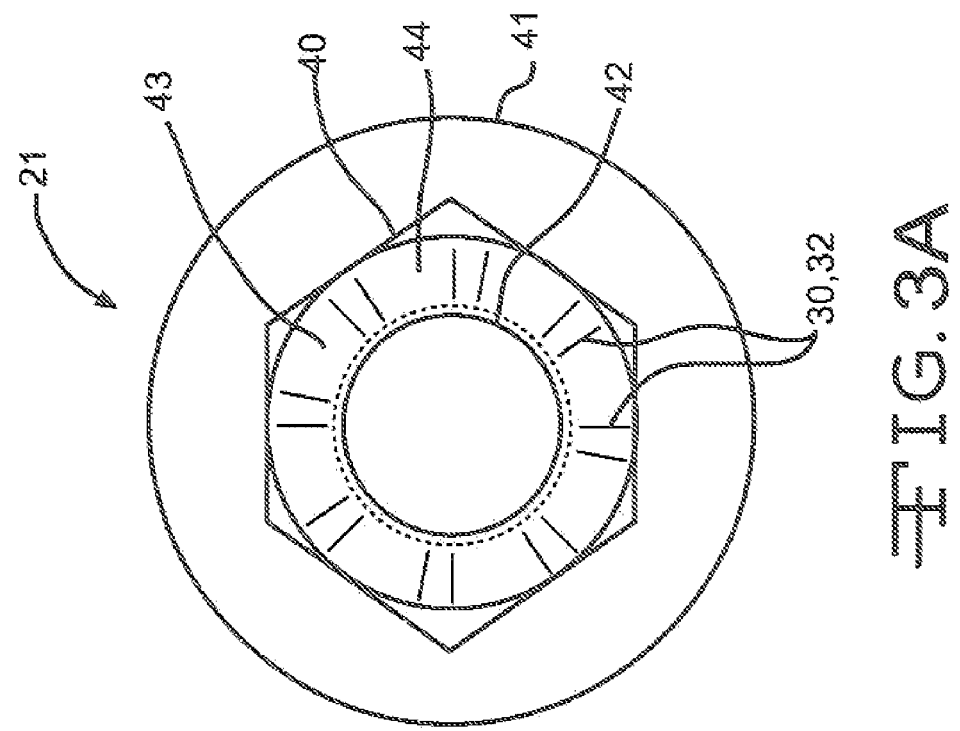
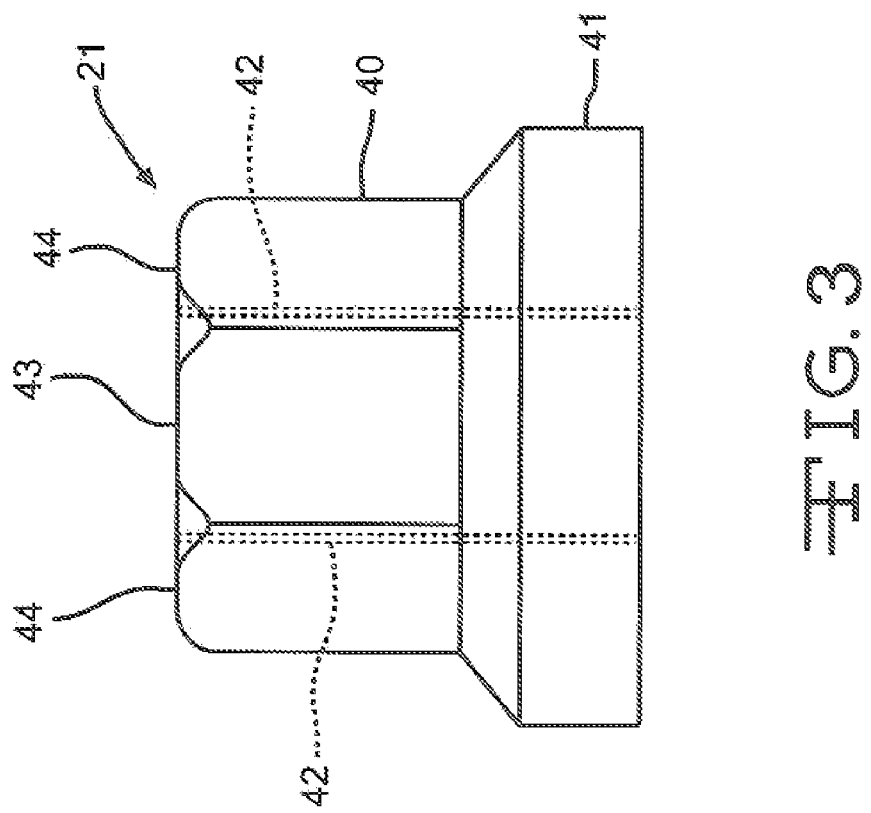

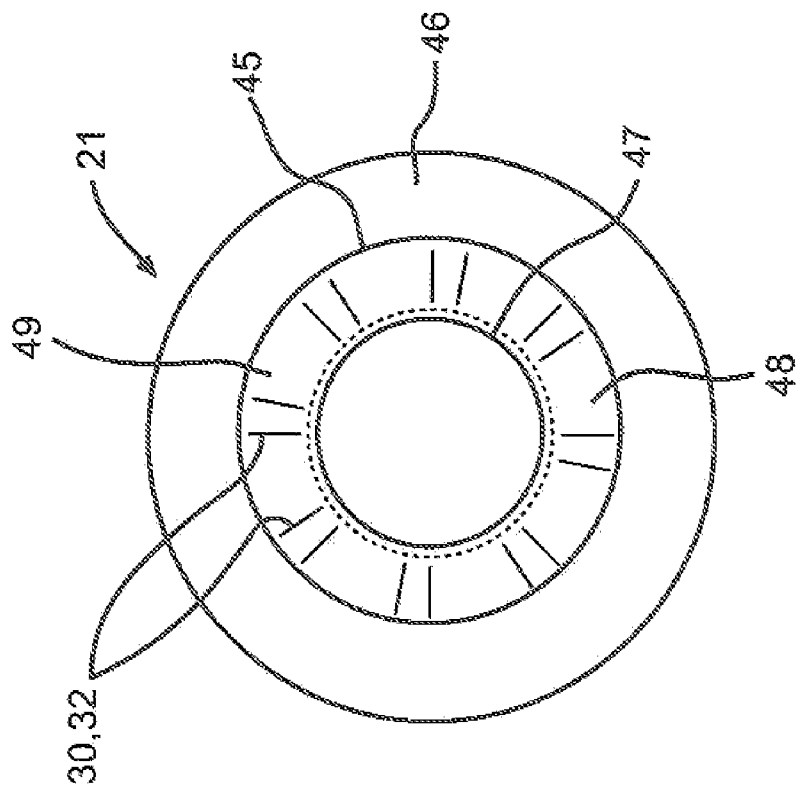
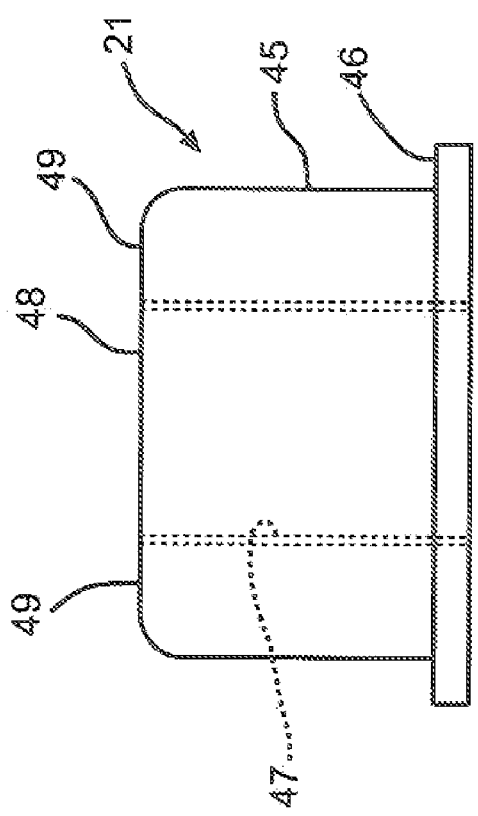
FIG. 4A
FIG. 4

INTELLIGENT FASTENER INSTALLATION SYSTEM

BACKGROUND

Many of the existing fasteners and/or fastener collars are not marked with any manufacture information such as part number, lot number, and manufacturer, and are often only marked with a supplier name. The manufacture information is often only carried by the package containing the batch of fasteners. When the package is opened, this information is often lost or has to be manually transferred to a manufacturing record. Many of the existing methods of verifying compatibility of fastener elements rely on the manual checking of a table to verify compatibility. Similarly, many of the existing methods of ensuring that the fasteners are installed correctly rely on manually checking tables to determine proper loading settings. Likewise, many of the existing methods of locating, tracking, and/or monitoring fasteners rely on the use of manual tables. However, manually-entering and checking tables may be time-consuming, unreliable, expensive, prone to error, and/or may experience other types of problems.

A fastening apparatus, and/or method of installing, locating, tracking, and/or monitoring a fastener is needed to decrease one or more problems associated with one or more of the existing fastening apparatus and/or methods.

SUMMARY

In one aspect of the disclosure, a method of installing a fastener comprises: (1) providing at least one of a fastener and a collar having a code; (2) scanning the code and retrieving first information regarding the at least one fastener and collar; (3) communicating the first information to a computer, the computer accessible to at least one database; (4) storing the first information in the at least one database; (5) communicating second information using the computer to a tool based on the first information; and (6) fastening the at least one fastener and collar using the second information and the tool.

In another aspect of the disclosure, a method of tracking and monitoring a fastener in an apparatus is disclosed. In one step, at least one of a fastener and a collar is provided attached at a location of the apparatus. The at least one fastener and collar has a code. In another step, the code is scanned and at least one of first information, second information, third information, and fourth information regarding the at least one fastener and collar is retrieved using a computer.

In still another aspect of the disclosure, a method of locating a fastener in an apparatus comprises: (1) providing at least one of a fastener and a collar having a code attached at a location of the apparatus; (2) providing a computer having cross-linked to the code at least one of first information, second information, third information, and fourth information regarding the at least one fastener and collar; and (3) determining a location of the at least one of fastener and collar using the computer.

In still another aspect of the disclosure, a fastening apparatus is disclosed. The fastening apparatus includes at least one of a fastener and a collar having a code. The code is cross-linked in at least one database of a computer to at least one of first information, second information, third information, and fourth information regarding the at least one fastener and collar.

These and other features, aspects and advantages of the disclosure will become better understood with reference to the following drawings, description and claims.

BRIEF DESCRIPTION OF THE DRAWINGS

FIG. 1 shows a perspective view, with dashed lines showing hidden elements, of one embodiment of a fastening apparatus being attached with a tool to two components of an apparatus;

FIG. 2 shows a side view of the fastener of the embodiment of FIG. 1;

FIG. 2A shows a top view of the fastener of the embodiment of FIG. 1;

FIG. 2B shows a block diagram showing various embodiments of the first information a code of the fastener may provide to a computer;

FIG. 3 shows a side view of the collar of the embodiment of FIG. 1, with the dashed lines depicting hidden elements;

FIG. 3A shows a top view of the collar of the embodiment of FIG. 1;

FIG. 4 shows a side view of another embodiment of a collar which may be attached to the fastener of the embodiment of FIG. 1, with the dashed lines depicting hidden elements;

FIG. 4A shows a top view of the collar of the embodiment of FIG. 4;

DETAILED DESCRIPTION

Figure 5:
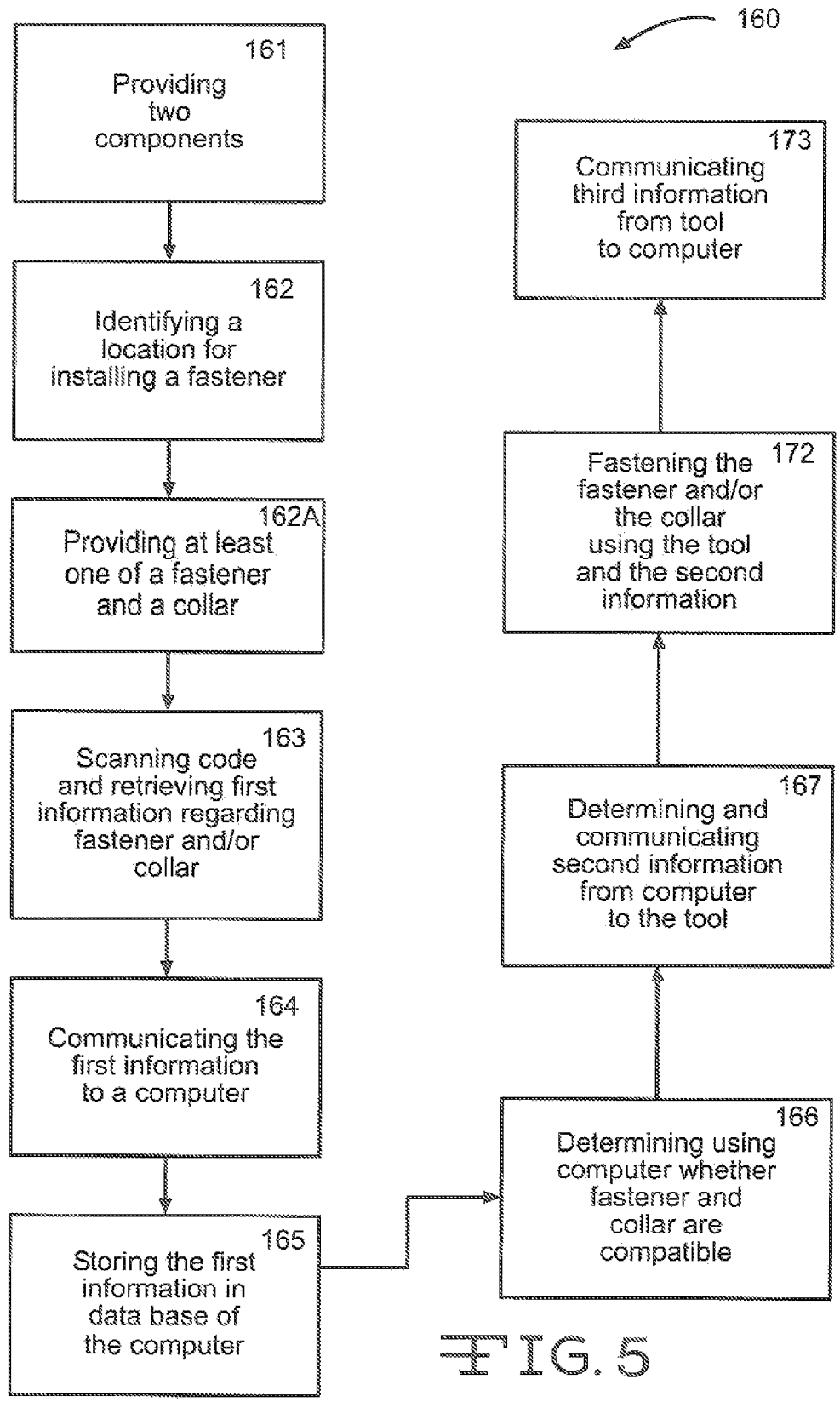
FIG. 5 shows a flowchart of one embodiment of a method of installing a fastener.

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

FIG. 1 shows a perspective view, with dashed lines showing hidden elements, of one embodiment of a fastening apparatus 10 being attached to two components 12 and 14 of an apparatus 16. The fastening apparatus 10 may comprise at least one of a fastener 18 and collar 21. The fastener 18 may comprise a one-piece fastener which may be attached without the use of collar 21, or may comprise a two-piece fastener which may be attached using collar 21. The fastener 18 may comprise an externally threaded bolt 19 which is inserted at a location 17 of the apparatus 16 through a hole 22 extending through the two components 12 and 14. The collar 21 may comprise an internally threaded nut 40 which screws onto the fastener 18 to lock the components 12 and 14 of the apparatus 10 together. The apparatus 16, including its components 12 and 14, may comprise a portion of an aircraft. In other embodiments, the apparatus 16 may comprise varying non-aircraft applications.

FIG. 2 shows a side-view of the fastener 18 of the embodiment of FIG. 1. FIG. 2A shows a top view of the fastener 18 of the embodiment of FIG. 1. As shown in FIGS. 2 and 2A, the fastener 18 may comprise a bolt 19 having a head 22, external threads 24, and an end surface 26. One or more portions 28 of the end surface 26 may be marked with a code 30. The code 30 may comprise laser reader markings 32 or other types of markings. FIG. 2B shows a block diagram showing the types of information the code 30 of the fastener 18 may provide. As shown, the code 30 may provide first information 32 regarding the fastener 18 such as supplier identification 33, part number 34, lot number 35, batch number 36, material 37, type 38 (which may include size), date 39, and other types of information regarding the fastener 18. In other embodiments, the fastener 18 may be in varying shapes, sizes, orientations, and configurations, and the code 30 may be on or in a varying portion of the fastener 18.

FIG. 3 shows a side-view of the collar 21 of the embodiment of FIG. 1, with the dashed lines depicting hidden elements. FIG. 3A shows a top view of the collar 21 of the embodiment of FIG. 1. As shown in FIGS. 3 and 3A, the collar 21 may comprise a nut 40 having a flange 41, internal threads 42, and an end surface 43. One or more portions 44 of the end surface 43 may be marked with a code 30. The code 30 may comprise laser reading markings 32 or other types of markings. The code 30 may provide the various types of first information 32 shown in FIG. 2B regarding the collar 21. For instance, the code 30 may provide first information 32 regarding the collar 21 such as supplier identification 33, part number 34, lot number 35, batch number 36, material 37, type 38 (which may include size), date 39, and other types of information regarding the collar 21. In other embodiments, the collar 21 may be in varying shapes, sizes, orientations, and configurations, and the code 30 may be on or in a varying portion of the collar 21.

FIG. 4 shows a side-view, with dashed lines depicting hidden elements, of another embodiment of a collar 21 comprising a sleeve 45 which may be attached to the fastener 18 of FIG. 1 instead of the nut 40. FIG. 4A shows a top view of the sleeve 45 of the embodiment of FIG. 4. As shown in FIGS. 4 and 4A, the sleeve 45 may comprise a flange 46, internal threads 47 (which are shown in hidden lines), and an end surface 48. One or more portions 49 of the end surface 48 may be marked with a code 30. The code 30 may comprise laser reading markings 32 or other types of markings. The code 30 may provide the various types of first information 32 shown in FIG. 2B regarding the sleeve 45. For instance, the code 30 may provide first information 32 regarding the sleeve 45 such as supplier identification 33, part number 34, lot number 35, batch number 36, material 37, type 38 (which may include size), date 39, and other types of information regarding the sleeve 45. In still other embodiments, the collar 21 may be in varying shapes, sizes, orientations, and configurations, and the code 30 may be on or in a varying portion of the collar 21.

As shown in FIG. 1, the collar 21 may be screwed onto the fastener 18 using a tool 50 such as a ratchet or other type of tool 50 which is adapted to screw the collar 21 onto the fastener 18 to lock the components 12 and 14 together. In other embodiments, the fastener 18 may be fastened without the use of collar 21. The tool 50 may have a smart chip 51 embedded within an outer surface 52 of the tool 50. An inner surface 53 defining a hole 54 may extend linearly from an end 59 of the tool 50. The timer surface 53 may be adapted to latch onto the collar 21 to screw the collar 21 onto the fastener 18. A laser reader 55, such as an optical laser reader, may be disposed within the hole 54. The laser reader 55 may be adapted to scan and read the code 30 of the fastener 18 and/or the collar 21 in order to retrieve the first information 32 regarding the fastener 18 and/or the collar 21. The first information 32 may be stored, in the smart chip 51. The smart chip 51 may be in wireless contact with a computer 56 which has access and is in communication with one or more databases 57.

FIG. 5 shows a flowchart of one embodiment of a method 160 of installing a fastener 18. In one step 161, two components 12 and 14 may be provided. The components 12 and 14 may be parts of an aircraft. In another step 162, a location 17 may be identified for installing a fastener 18 to assemble the components. In an additional step 162A, at least one of a fastener 18 and a collar 21 may be provided. A one-piece fastener 18 may be used without a collar 21, or a two-piece fastener 18 may be used with a collar 18. The fastener 18 may be a bolt 19. The collar 21 may be a nut 40 or a sleeve 45. One or more of the fastener 18 and/or the collar 21 may have a code 30 which may be one of more laser markings 32.

In yet another step 163, the code 30 may be scanned and first information 32 may be retrieved regarding at least one of the fastener 18 and/or the collar 21. The code 30 may be scanned using a laser reader 55 of a tool 50. The first information 32 may comprise supplier identification 33, part number 34, lot number 35, batch number 36, material 37, type 38 (which may include size), date 39, and other types of information regarding the fastener 18 and/or the collar 21. The first information 32 scanned by the laser reader 55 may be transferred to the smart chip 51 of the tool 50.

In an additional step 164, the first information 32 may be communicated from the smart chip 51 of the tool 50 to a computer 56. The computer 56 may have access to one or more databases 57. In yet another step 165, the first information 32 may be stored in the one or more databases 57 of the computer 56. In step 166, if a two-piece fastener 18 is used with a collar 21, the computer 56 may determine based on the first information 32 whether the fastener 18 and the collar 21 are compatible with one another. If the fastener 18 and the collar 21 are not compatible, the computer 56 may send a signal to the tool 50 to not install the fastener 18 to the collar 21. If the fastener 18 and the collar 21 are compatible, the computer 56 may proceed to step 167. In other embodiments, step 166 may be skipped, and a determination may not be made as to compatibility.

Figure 6:
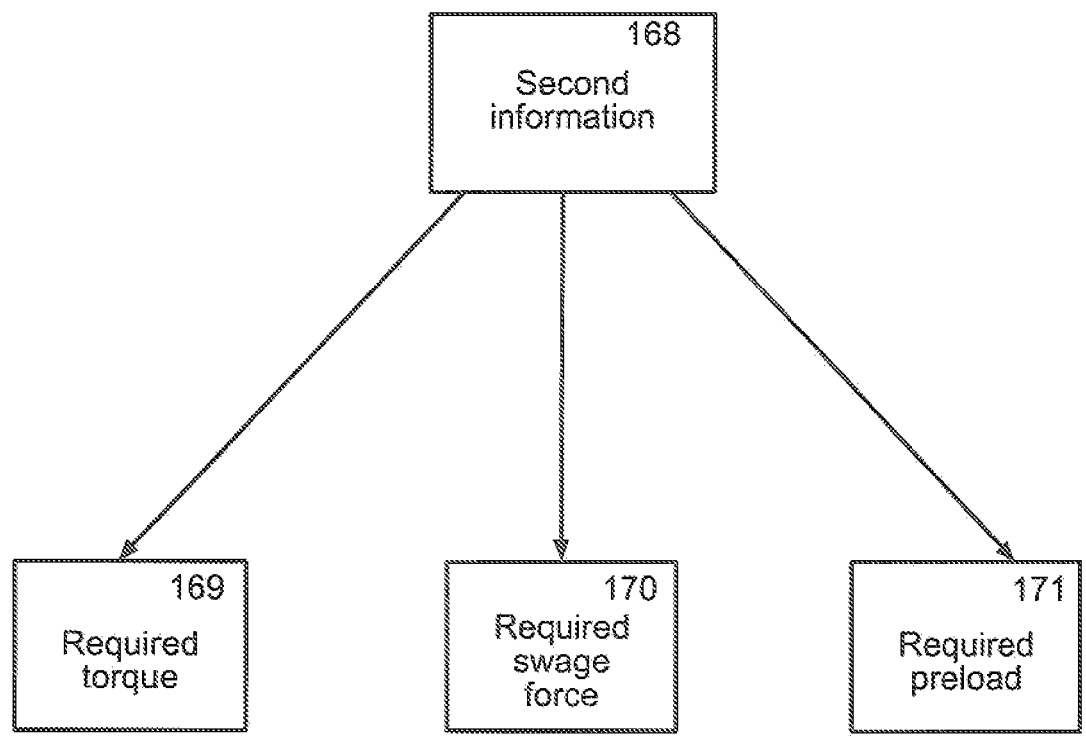
FIG. 6 shows a block diagram disclosing various embodiments of second information regarding the fastener and/or the collar which may be communicated from a computer to a tool.

In step 167, the computer 56 may determine and communicate second information 168 to the tool 50 based on the first information 32. As shown in FIG. 6, which shows a block diagram showing the types of second information 168, the second information 168 may comprise at least one of required torque 169, required swage force 170, required preload 171, or other types of information. In such manner, based on the first information 32 regarding the fastener 18 and/or the collar 21, the computer may determine, by accessing database 57, the appropriate torque 169, swage force 170, and/or preload 171 to apply to the fastener 18 and/or the collar, and may communicate that second information 168 to the tool 50.

Figure 7:
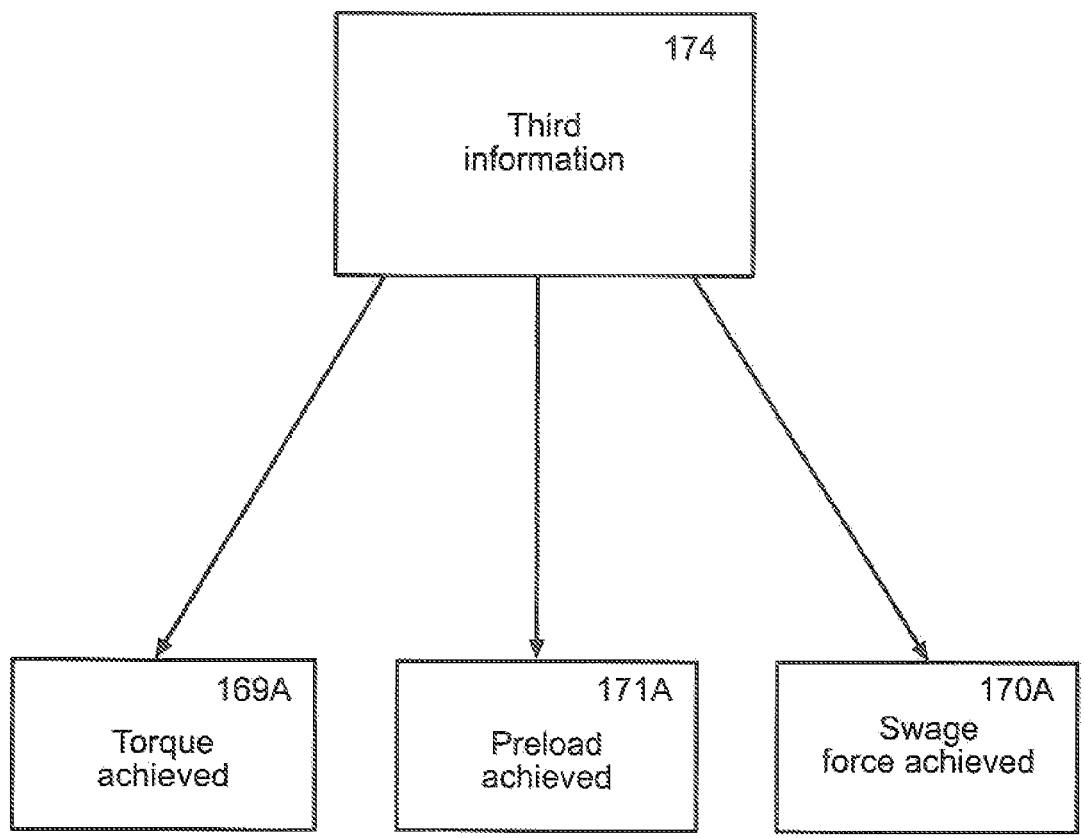
FIG. 7 shows a block diagram disclosing various embodiments of third information regarding the fastener and/or the collar which may be communicated to a computer from a tool.

In still another step 172, the fastener 18 and/or collar 21 may be fastened using the tool 50 based on the communicated second information 168. In such manner, the fastener 18 and/or collar 21 may be fastened with the appropriate torque 169, swage force 170, and/or preload 171 for that type of fastener 18 and/or collar 21. In an additional step 173, the tool 50 may communicate third information 174 to the computer 56. As shown in FIG. 7, which shows a block diagram: showing the types of third information 174, the third information 174 may comprise an amount of at least one of torque 169A, preload 171A, and swage force 170A which the tool 50 actually applied to the fastener 18 and/or the collar 21 during installation. The computer 56 may store the third information 174 in database 57.

Figure 8:
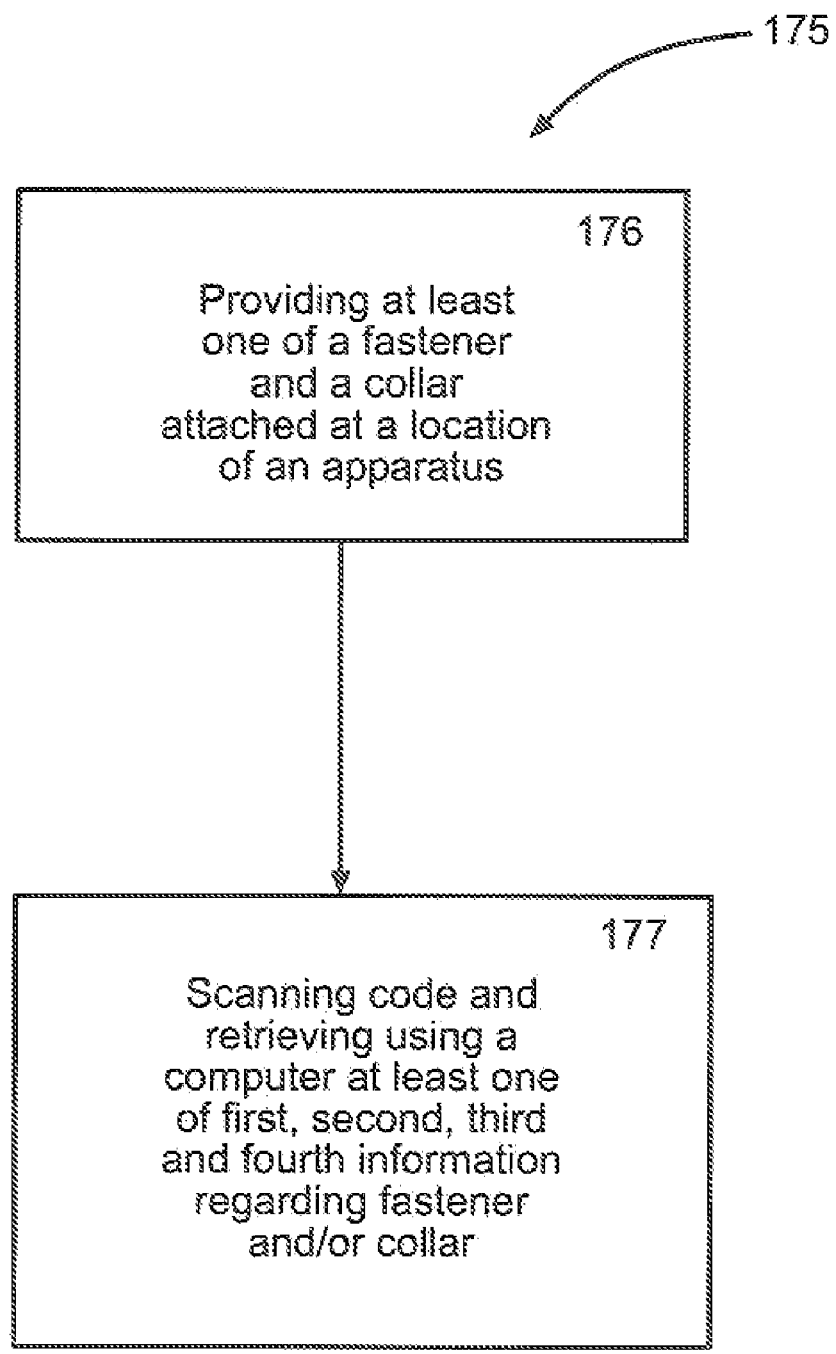
FIG. 8 shows a flowchart of an embodiment of one embodiment of a method of tracking and monitoring a fastener in an apparatus.
Figure 9:
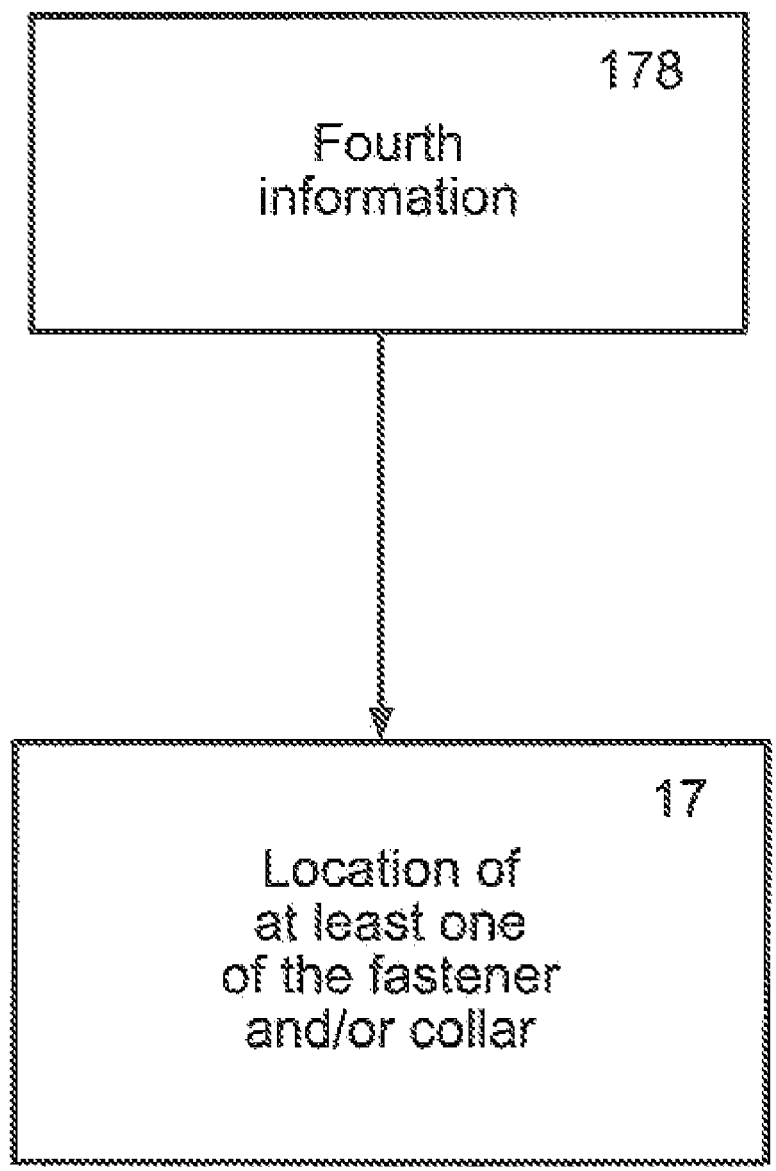
FIG. 9 shows a block diagram disclosing one embodiment of fourth information which a computer may contain regarding a fastener and/or a collar.

FIG. 8 shows a flowchart of an embodiment of one embodiment of a method 175 of tracking and monitoring a fastener 18 in an apparatus 16. In one step 176, at least one of a fastener 18 and a collar 21 may be provided attached at a location 17 of the apparatus 16. At least one of the fastener 18 and/or the collar 21 may have a code 30. In another step 177, the code 30 may be scanned and at least one of first information 32, second information 168, third information 174, and fourth information 178 regarding at least one of the fastener 18 and/or the collar 21 may be retrieved using a computer 56. As shown in FIG. 9, which shows a block diagram showing the fourth information 178, the fourth information 178 may comprise the location 17 of at least one of the fastener 18 and or the collar 21.

Figure 10:
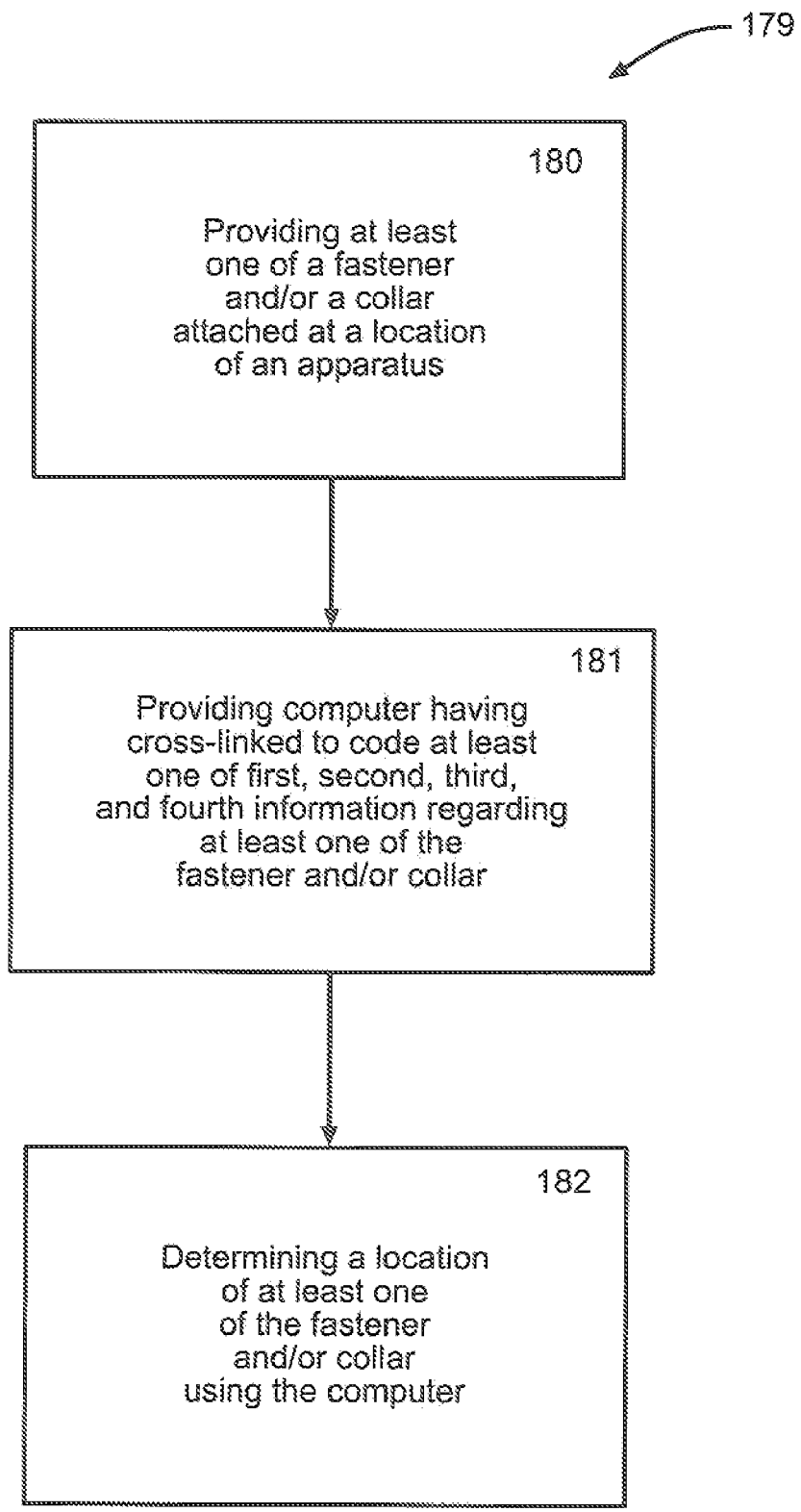
FIG. 10 shows one embodiment of a method of locating a fastener in an apparatus.

FIG. 10 shows one embodiment of a method 179 of locating a fastener 18 in an apparatus 16, in one step 180, at least one of a fastener 18 and a collar 21 are provided attached at a location 17 of the apparatus 16. At least one of the fastener 18 and/or the collar 21 have a code 30. In step 181, a computer 56 is provided having cross-linked to the code 30 at least one of first information 32, second information 168, third information 174, and fourth information 178 regarding at least one of the fastener 18 and/or the collar 21. In one embodiment, at least two of the first information 32, second information 168, third information 174, and fourth information 178 are cross-linked in the computer 56. In step 182, a location 17 of at least one of the fastener 18 and/or the collar 21 is determined using the computer 56.

In another embodiment, as shown in FIG. 1, a fastening apparatus 10 may include at least one of a fastener 18 and/or a collar 21 having a code 30. The code 30 may be cross-linked in a database 57 of a computer 56 to at least one of first information 32, second information 168, third information 174, and fourth information 178 regarding the at least one fastener 18 and/or collar 21.

One or more embodiments of the disclosure may reduce and/or eliminate one or more problems of one or more of the existing fastening apparatus and/or methods of installation, location, tracking, and/or monitoring. One or more embodiments of the disclosure may save time, may increase reliability, may decrease error, may improve efficiency, may reduce cost, and/or may reduce one or more other types of problems of one or more of the existing fastening apparatus and/or methods of installation, location, tracking, and/or monitoring.

It should be understood, of course, that the foregoing relates to exemplary embodiments of the disclosure and that modifications may be made without departing from the spirit and scope of the disclosure as set forth in the following claims.

The invention claimed is:

1. A method of installing a fastener comprising:
providing a fastener and a collar each having a code;
scanning the codes and retrieving first information regarding each of said fastener and said collar;
communicating the first information to a computer, the computer accessible to at least one database;
storing the first information in the at least one database;
checking with the computer, based on the codes, to ensure that the fastener and the collar are compatible with one another;
communicating second information using the computer to a tool based on the first information; and
fastening said fastener to said collar using the second information and the tool.

2. The method of claim 1 further comprising at least one of the steps of providing two components, identifying a location for installing the fastener to assemble the two components, and inserting the fastener through a hole extending within the two components.

3. The method of claim 2 wherein the two components are parts of an aircraft.

4. The method of claim 1 wherein the collar is at least one of a sleeve and a nut.

5. The method of claim 1 wherein the fastener is a bolt.

6. The method of claim 1 wherein the codes are laser markings.

7. The method of claim 1 wherein the first information is at least one of supplier identification, part number, lot number, batch number, material, type, size, and date.

8. The method of claim 1 wherein the second information is at least one of required torque, required swage force, and required preload.

9. The method of claim 1 further comprising the tool communicating third information to the computer, wherein the third information comprises an amount of at least one of torque, preload, and swage force which the tool applied to fasten the fastener to said collar, and the computer storing said at least one applied torque, preload, and swage force in the at least one database.

10. A method of tracking and monitoring a fastener in an apparatus comprising:
providing a fastener attached to a collar at a location of the apparatus, each of the fastener and the collar having a code; and
scanning the codes and retrieving using a computer at least one of first information, second information, third information, and fourth information regarding each of the fastener and the collar.

11. The method of claim 10 wherein the apparatus is a portion of an aircraft.

12. The method of claim 10 wherein the fastener is a bolt.

13. The method of claim 10 wherein the collar is at least one of a sleeve and a nut.

14. The method of claim 10 wherein the codes are laser markings.

15. The method of claim 10 wherein the first information is at least one of supplier identification, part number, lot number, batch number, material, type, and date.

16. The method of claim 10 wherein the second information is at least one of torque, swage force, and preload which should have been applied to attach the fastener to the collar.

17. The method of claim 10 wherein the third information is at least one of torque, swage force, and preload which was applied to attach the fastener to the collar.

18. The method of claim 10 wherein the fourth information is the location of the apparatus at which the fastener is attached to the collar.

19. A method of locating a fastener in an apparatus comprising:
providing a fastener attached to a collar at a location of the apparatus, each of the fastener and the collar having a code;
providing a computer having cross-linked to the codes at least one of first information, second information, third information, and fourth information regarding each of the fastener and the collar; and
determining, using the computer, location of the apparatus at which the fastener is attached to the collar.

20. The method of claim 19 wherein the first information is at least one of supplier identification, part number, lot number, batch number, material, type, and date, the second information is at least one of torque, swage force, and preload which should have been applied to attach the fastener to the collar, the third information is at least one of torque, swage force, and preload which was applied to attach the fastener to the collar, and the fourth information is the location of the apparatus at which the fastener is attached to the collar.

21. The method of claim 19 wherein at least two of the first information, second information, third information, and fourth information are cross-linked in the computer.

22. A fastening apparatus comprising:
a fastener and a collar, each of the fastener and the collar having a code, wherein the codes are cross-linked in at least one database of a computer to at least one of first information, second information, third information, and fourth information regarding each of the fastener and the collar.

23. The fastening apparatus of claim 22 wherein the first information is at least one of supplier identification, part number, lot number, batch number, material, type, and date, the second information is at least one of torque, swage force, and preload which should have been applied to attach the fastener to the collar, the third information is at least one of torque, swage force, and preload which was applied to attach the fastener to the collar, and the fourth information is a location at which the fastener is attached to the collar.

24. The fastening apparatus of claim 22 wherein the codes are laser markings.

25. The method of claim 1 wherein the codes are one-dimensional markings.

26. The method of claim 10 further comprising checking with the computer, based on the codes, to ensure that the fastener and the collar are compatible with one another.

27. The method of claim 10 wherein the codes are one-dimensional markings.

28. The method of claim 19 further comprising checking with the computer, based on the codes, to ensure that the fastener and the collar are compatible with one another.

29. The method of claim 19 wherein the codes are one-dimensional markings.

30. The fastening apparatus of claim 22 wherein the codes are decipherable by the computer to ensure that the fastener and the collar are compatible with one another.

31. The fastening apparatus of claim 22 wherein the codes are one-dimensional markings.

\* \* \* \* \*